3,564,607
HALOGENATED ARYLOXYACETYL
CYANAMIDES
Herman Breuer, Regensburg, Germany, assignor to Olin
Corporation, a corporation of Virginia
No Drawing. Continuation-in-part of application Ser. No.
566,480, July 20, 1966. This application Oct. 9, 1967,
Ser. No. 674,008
Claims priority, application Germany, July 30, 1965,
C 36,548
Int. Cl. C07c *103/30*
U.S. Cl. 260—429.9                        19 Claims

ABSTRACT OF THE DISCLOSURE

A series of halogenated aryloxyacetyl cyanamides has been provided. These compounds are characterized by unique biological properties, and it has been found that members of the series provided herein are outstanding herbicides.

---

This application is a continuation-in-part of my co-pending application S.N. 566,480, filed on July 20, 1966, now abandoned.

This invention relates to the preparation of selected acyl cyanamides having the following general formula:

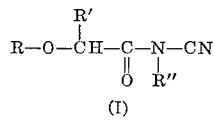

(I)

wherein R represents a halogenated aryl moiety; R' represents hydrogen or an alkyl group; and R" represents hydrogen, alkyl, aryl, aralkyl or a selected metal.

Certain acyl cyanamides have been previously prepared and described in the literature. Thus, for instance, the preparation of p-chlorobenzoyl cyanamide has been described by Howard and Youngblood in J. Org. Chem. 31 (1966) page 959. However, the preparation of substituted acyl cyanamides having a halogenated aryloxyacetyl moiety attached to the cyanamide group has not heretofore been accomplished. In accordance with this invention, a series of substituted cyanamides of this nature has now been provided, and the members of the Group I are characterized by outstanding herbicidal activity. They are particularly attractive herbicides since they selectively destroy weeds in crop areas without substantially affecting the crops.

The preparation of most of the compounds included in the general Formula I proceeds in accordance with the usual procedures involved in preparing acyl cyanamides; that is, they are provided by the reaction of cyanamide or salts thereof with acid chlorides preferably in the presence of a suitable base.

Thus the preferred technique for providing the compounds I wherein R and R' are as previously defined and wherein R" is hydrogen involves reacting cyanamide or salts thereof with substituted acyl halides of the formula:

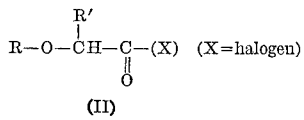

(II)

in the presence of a base in order to facilitate the reaction. Although any halide (e.g., fluoride, bromide, iodide, chloride) may be used in the preparation of the products of this invention, the substituted acyl chlorides of the Formula II (wherein X is Cl) are preferred reactants in view of their easy availability and lower price.

The group R in the starting reactant II represents any halogenated aryl group. As used in the specification and claims herein, the term "aryl" represents a group not containing any unsaturation other than of the benzenoid type. A preferred embodiment of this invention involves the preparation of the compounds I (using reactants II) wherein the aryl portion of said R has from 6–10 carbon atoms such as, for instance, phenyl, tolyl, xylyl, naphthyl and the like. In addition these aryl moieties must contain at least one ring substituted halogen substituent such as chlorine, bromine, fluorine and iodine.

Also useful as starting reactants in the preparation of the products of this invention are those reactants II wherein R' represents either hydrogen or lower alkyl (1–4 carbon atoms). Preferred practice involves, however, employing the substituted acyl halides II wherein R' represents hydrogen.

Illustrative of the reactants encompassed by the general Formula II which may be used in preparation of the products of this invention are, for example: o-chlorophenoxyacetyl chloride, o-fluorophenoxyacetyl chloride, o-bromophenoxyacetyl chloride, o-iodophenoxyacetyl chloride, m-chlorophenoxyacetyl chloride, m-fluorophenoxyacetyl chloride, m-bromophenoxyacetyl chloride, m-iodophenoxyacetyl chloride, p-chlorophenoxyacetyl chloride, p - fluorophenoxyacetyl chloride, p - bromophenoxyacetyl chloride, p-iodophenoxyacetyl chloride, 2,4-dichlorophenoxyacetyl chloride, 2,4-dibromophenoxyacetyl chloride, 2,4-diiodophenoxyacetyl chloride, 2,4-difluorophenoxyacetyl chloride, 2-chloro-3-bromophenoxyacetyl chloride, 2 - bromo - 4 - chlorophenoxyacetyl chloride, 2,5-dichlorophenoxyacetyl chloride, 2,5-difluorophenoxyacetyl chloride, 2-bromo-5-chlorophenoxyacetyl chloride, 2,6-dichlorophenoxyacetyl chloride, 2,6-dibromophenoxyacetyl chloride, 2,6-diiodophenoxyacetyl chloride, 2,6-difluorophenoxyacetyl chloride, 3,4-dichlorophenoxyacetyl chloride, 3,4-dibromophenoxyacetyl chloride,3,4-diiodophenoxyacetyl chloride, 3,5-dichlorophenoxyacetyl chloride, 3,5-dibromophenoxyacetyl chloride, 3,5-diiodophenoxyacetyl chloride and 3-bromo-5-chlorophenoxyacetyl chloride.

Similarly, among the useful reactants which may be utilized in the practice of this invention are 2,3,5-trichlorophenoxyacetyl chloride, 2,4,6 - trichlorophenoxyacetyl chloride, 4,6-dichloro-2-bromophenoxyacetyl chloride, 2,6 - dichloro - 4 - bromophenoxyacetyl chloride, 6-chloro-2,4-dibromophenoxyacetyl chloride, 2,4,6-tribromophenoxyacetyl chloride, 2,3,5-tribromophenoxyacetyl chloride, 2,3,5-triiodophenoxyacetyl chloride, 2,4,6-triiodophenoxyacetyl chloride, 4 - chloro - 2,6 - dibromophenoxyacetyl chloride, 6-fluoro-2,4-dibromophenoxyacetyl chloride, 4-fluoro-2,6-dibromophenoxyacetyl chloride, 4-fluoro-2,6-dichlorophenoxyacetyl chloride, 2,3,4,6-tetrachlorophenoxyacetyl chloride, 2,3,4,6-tetrabromophenoxyacetyl chloride, 2,4,6 - trichloro - 3 - bromophenoxyacetyl chloride, 2,3,5-trichloro-4-iodophenoxyacetyl chloride, 3-fluoro - 2,4,6 - tribromophenoxyacetyl chloride, 3 - fluoro-2,4,6-trichlorophenoxyacetyl chloride, pentachlorophenoxyacetyl chloride, pentabromophenoxyacetyl chloride, 2,4,5,6 - tetrachloro - 3 - bromophenoxyacetyl chloride, 2-methyl-4-chlorophenoxyacetyl chloride, 2-methyl-4-fluorophenoxyacetyl chloride, 2-methyl-4-bromophenoxyacetyl chloride, and 2-methyl-4-iodophenoxyacetyl chloride.

Likewise, 4-fluoro - (1 - naphthyloxy)acetyl chloride, 2-chloro-(1-naphthyloxy)acetyl chloride, 8 - chloro-(1-naphthyloxy)acetyl chloride, 4-bromo-(1-naphthyloxy) acetyl chloride, 1-chloro-(2-naphthyloxy)acetyl chloride, 4-chloro-(2-naphthyloxy)acetyl chloride, 1,3-dichloro-(2-naphthyloxy)acetyl chloride, 1,4-dichloro-(2-naphthyloxy)acetyl chloride, 1,4,6-trichloro-(2-naphthyloxy)acetyl chloride, 1-chloro-6-bromo - (2 - naphthyloxy)acetyl chloride, 2-(p-chlorophenoxy)propionyl chloride, 2-(2,4- dichlorophenoxy)propionyl chloride, 2-(o-chlorophenoxy)butryl chloride, 2-(p-chlorophenoxy)hexanoyl chloride, and 2-(2,4-dichlorophenoxy)hexanoyl chloride may be utilized as starting reactants.

Preferred embodiments of this invention include those compounds of the general Formula I wherein said R group is a chlorinated aryl group containing from 1–5 chlorine atoms substituted on the aryl ring.

The acylation procedure for providing the compounds I wherein R'' represents hydrogen is conveniently performed by reacting the aforementioned acid halides II with cyanamide or salts thereof in an aqueous-organic medium such as water admixed with various inert organic solvents including acetone, dioxane and the like. A typical suitable reaction medium is a 30 percent acetone solution in water. A reaction temperature range of about −10° C. to about 50° C. is preferentially employed in the acylation process. Stoichiometric quantities of cyanamide and acid chloride may be employed, although suitably slight molar excesses of cyanamide up to about 20 percent over the stoichiometric amount may be utilized. As mentioned in the preceding discussion, the process is preferably carried out in the presence of a base such as an alkali metal or an alkaline earth metal hydroxide for best results. It has been found that a molar excess of such base is preferably employed, and at least 2 moles of said base/mole of cyanamide reactant should be utilized for optimum yield of product. The base forms a salt both with liberated hydrogen halide and with the provided substituted cyanamide product wherein said product remains in desired solution. Upon completion of the reaction period, the reaction mixture is usually filtered to remove insoluble impurities prior to obtaining the desired product by acidification of the filtrate. The halogenated aryloxyacetyl cyanamide products are then readily isolated by conventional filtration procedures.

The compounds of Formula I wherein R and R' are as previously represented and R'' is hydrogen are thus provided in accordance with the above procedure. Other procedures are then followed to provide the halogenated aryloxyacetyl cyanamides having the Formula I wherein R'' represents an alkyl group. For instance, the compounds I wherein R'' represents hydrogen are readily reacted with alkylating agents known to those skilled in this art such as the dialkyl sulfates. Preferred embodiments of this invention are obtained when dialkyl sulfates are employed in this manner wherein the alkyl substituents have 1–4 carbon atoms such as dimethyl sulfate.

Alternatively, the compounds encompassed by the Formula I wherein R'' represents alkyl, aryl or aralkyl are also provided by first preparing the appropriate alkyl, aryl or aralkyl cyanamides, making the alkali metal salts of said cyanamides and acylating said salts with the aforementioned halogenated aryloxyacetyl chlorides. Preferred embodiments of this invention include those compounds of Formula I wherein R'' is phenyl or benzyl.

The compounds of the general Formula I wherein R'' represents hydrogen are acidic in nature, and they are readily converted to salts which are also useful agricultural chemicals. Thus, those halogenated aryloxyacetyl cyanamides I (wherein R'' is hydrogen) are easily reacted with the alkali metal hydroxides to provide useful herbicides. Any of the alkali metal hydroxides may be used in this manner including lithium, sodium, potassium, cesium and rubidium hydroxides; but preferred embodiments of this invention include the potassium salts. In a similar fashion, the alkaline earth metal (Ca, Sr, Ba) salts also are readily obtainable; and it has been demonstrated that these salts are characterized by outstanding herbicidal properties. Likewise, the compounds I wherein R'' represents other metals of Group II in the Periodic Table such as zinc, magnesium and cadmium are easily provided in accordance with this invention.

Organic bases may also be reacted with the compounds I (wherein R'' is hydrogen) to provide salts having good utility as herbicides. For instance, tertiary amines such as trialkyl amines (e.g., triethylamine) may be utilized in such salt preparations as well as other commonly used organic bases such as pyridine and the like. The various ethanolamines may also be employed in the preparation of useful salts in accordance with the invention disclosed herein.

The following examples serve to further illustrate the preparation of the novel products of this invention. However, it is understood that these examples are not to be considered as limiting the scope of this invention in any manner and are furnished merely for the purpose of illustration.

EXAMPLE 1

A solution of 277.2 g. (4.2 moles of 85% potassium hydroxide in 2 liters of water was cooled to 25° C., and 200 g. (2.3 moles) of 50% aqueous cyanamide was added. The stirred solution was then maintained at 10–15° C. while a solution of 410 g. (2.0 moles) of o-chlorophenoxyacetyl chloride in 400 ml. of acetone was added. After addition, the easily stirred slurry was stirred an additional half hour and then acidified with 225 g. (2.25 moles) of concentrated hydrochloric acid diluted with ice water. The nearly colorless solid was filtered, washed well with water, and air dried. Some oil passed into the filtrate. The solid product weighed 372 g. (88.3% yield) and melted at 93–103° C. Recrystallization of 40.0 g. from chloroform, with charcoal treatment, gave 24.8 g. of off-white product; M.P. 116–117° C. The following analytical data revealed that o-chlorophenoxyacetylcyanamide had been obtained.

*Analysis.*—Calcd. for $C_9H_7ClN_2O_2$ (percent): C, 51.30; H, 3.32; N, 13.30. Found (percent): C, 51.21; H, 3.20; N, 13.24.

EXAMPLE 2

109 g. (2.6 moles) of anhydrous cyanamide was dissolved in 2,450 mls. of water, and 262 mls. of 30% sodium hydroxide solution was added to the cyanamide solution. The resulting solution was cooled to −5° C.–0° C., and then with stirring and cooling 532 g. (2.6 moles) of p-chlorophenoxyacetyl chloride in 735 mls. of acetone was added dropwise to the first solution. Concurrently, 262 mls. of 30% sodium hydroxide was added to the cyanamide solution, and both additions were completed in about one hour. The resulting reaction mixture was then stirred for 30 additional minutes. Filtration of the reaction mixture removed a small amount of solid impurities. The clear filtrate was acidified with concentrated hydrochloric acid while maintaining the temperature at 0° C. A precipitate formed, was filtered off, washed with water, and dried in air to provide 516 g. of a fine white powder melting at 124–126° C. Elemental analysis confirmed that the desired p-chlorophenoxyacetylcyanamide had been obtained.

EXAMPLE 3

A stirred solution of 138.6 g. (2.1 moles) of 85% potassium hydroxide in 1 liter of water was cooled to 25° C. and 46.2 g. (1.1 moles) of anhydrous cyanamide added. The solution was cooled to 10° C. and kept at 10–15° C. while 239.5 g. (1.0 mole) of crude 2,4-dichlorophenoxyacetyl chloride in 200 ml. of acetone was added. Within a short time the amount of potassium salt was too thick for good stirring and additional water was added. At the end of addition the chloride, 3 liters more of water had been added and stirring was still difficult.

The thick mass was acidified with 120 g. (1.2 moles) of concentrated hydrochloric acid. The filtered, water washed solid was air dried. The yield of nearly colorless solid was 226 g. (92.2%); M.P. 127–130° C. Recrystallization of 50 g. from ethanol, with charcoal treatment, gave 22.0 g.; M.P. 136–137° C. The following analytical data revealed that 2,4-dichlorophenoxyacetylcyanamide had been obtained.

*Analysis.*—Calcd. for $C_9H_6Cl_2N_2O_2$ (percent): C, 44.08; H, 2.44; N, 11.42. Found (percent): C, 44.53; H, 2.59; N, 11.41.

EXAMPLE 4

To a cold solution of 277.2 g. (4.2 moles) of 85% potassium hydroxide in 3 liters of water was added 200 g. (2.3 moles) of 50% aqueous cyanamide. The stirred solution was maintained at 15–20° C. while a solution of 548 g. (2.0 moles) of 2,4,5-trichlorophenoxyacetyl chloride in 300 ml. of acetone was added. After addition, the thick slurry was stirred 15 minutes and acidified with cold, dilute hydrochloric acid. The nearly colorless solid was filtered, washed with water, and air dried. The product weighed 501 g. (89.6%); M.P. 170–173° C.

For purification, 85 g. of the crude material was heated with 150 ml. of ethanol. Insolubles (trimer) were present and removed by filtration. The filtrate was poured into ice water, giving a gum which solidified on standing. The material weighed 44 g. and melted at 119–123° C., with appreciable softening below this temperature. A second recrystallization from chloroform with charcoal treatment, gave 14.9 g. of product; M.P. 97–98° C. Elemental analysis confirmed that the desired 2,4,5-trichlorophenoxyacetylcyanamide had been obtained in this latter product.

EXAMPLE 5

A stirred solution of 277.2 g. (4.2 moles) of 85% potassium hydroxide in 2 liters of water was cooled to 25° C. and 200 g. (2.3 moles) of 50% aqueous cyanamide added. The stirred solution was cooled further and kept at 10–15° C. while a solution of 438 g. (2.0 moles) of 2-methyl-4-chlorophenoxyacetyl chloride in 400 ml. of acetone was added. The solution was then stirred one half hour longer and acidified with cold, dilute hydrochloric acid. The resulting tan precipitate was filtered, washed with water, and air dried. The crude weight was 439 g. (97.7% yield); M.P. 128–132° C. A portion of 60 g. was recrystallized from chloroform with charcoal treatment giving 37.8 g. of off-white crystals; M.P. 142–143° C. The following analytical data revealed that 2-methyl-4-chlorophenoxyacetylcyanamide had been obtained.

*Analysis.*— Calcd. for $C_{10}H_9ClN_2O_2$ (percent): C, 53.45; H, 4.00; Cl, 15.81; N, 12.47. Found (percent) C, 53.59; H, 3.86; Cl, 15.69; N, 12.49.

EXAMPLE 6

A solution of 42.1 g. (0.20 mole) of p-chlorophenoxyacetylcyanamide in 250 ml. of water, containing 13.2 g. (0.20 mole) of 85% potassium hydroxide was heated to boiling, charcoaled, and filtered. Dimethylsulfate (26.4 g.; 0.21 mole) was added to the filtrate and the mixture stirred and heated to reflux. Within a short time a heavy oil separated. The mixture was refluxed an hour, poured into ice, and the solid recovered. The crude yield was 23.0 g. (51.2% yield; M.P. 81–89° C.). Purification from ethanol, with charcoal treatment, gave 9.3 g. of off-white crystals; M.P. 91–92° C. The following analytical data revealed that the desired p-chlorophenoxyacetyl-N-methylcyanamide had been obtained.

*Analysis.* — Calcd. for $C_{10}H_9ClN_2O_2$ (percent): C, 53.45; H, 4.00; Cl, 15.81. Found (percent) C, 52.88; H. 4.03; Cl, 15.81.

EXAMPLE 7

A solution of 44.9 g. (0.20 mole) of 2-methyl-4-chlorophenoxy-acetylcyanamide in 250 ml. of water containing 13.2 g. (0.20 mole) of 85% potassium hydroxide was heated to boiling, charcoaled, and filtered. After addition of 26.4 g. (0.21 mole) of dimethyl sulfate to the filtrate, the mixture was stirred and refluxed for 30 minutes. The mixture, containing an oil, was poured onto ice. Filtration of the resulting mixture gave 32.7 g. (68.5% yield) of tan, sticky solid. Purification from ethanol, with charcoal treatment, gave 9.1 g. of tan crystals melting at 69–70° C. Elemental analysis confirmed that 4-chloro-o-tolyloxyacetyl-N-methylcyanamide had been provided in good purity.

EXAMPLE 8

A mixture of 41.9 g. (0.15 mole) of 2,4,5-trichlorophenoxyacetyl-cyanamide, 9.9 g. (0.15 mole) of 85% potassium hydroxide and 200 ml. of water was heated to boiling. The solution was charcoaled and filtered. After addition of 20.1 g. (0.16 mole) of dimethyl sulfate, the mixture was stirred and refluxed for an hour. The resulting heavy oil was poured onto ice and the solid recovered. The crude yield was 37.1 g. (84.3%); M.P. 110–118° C. Recrystallization from ethanol, with charcoal treatment, gave 6.2 g. of product; M.P. 122–123° C. The following analytical data revealed that the desired 2,4,5 - trichlorophenoxyacetyl - N - methylcyanamide had been obtained.

*Analysis.*—Calcd. for $C_{10}H_7Cl_3N_2O_2$ (percent): (C, 40.88; H, 2.38; N, 9.54. Found (percent): C. 40.72; H, 2.56; N, 9.59.

EXAMPLE 9

A mixture of 42.1 g. (0.20 mole) of o-chlorophenoxyacetylcyanamide, 13.2 g. (0.20 mole) of 85% potassium hydroxide, and 100 ml. of water was heated to boiling, charcoaled, filtered, and cooled. Recovery of off-white salt was 24.0 g. (48.2% yield); M.P. 241–242° C. The following analytical data revealed that potassium o-chlorophenoxyacetylcyanamide had been obtained.

*Analysis.*—Calcd. for $C_9H_6ClN_2O_2K$ (percent): C, 43.46; H, 2.41; Cl, 14.28. Found (percent): C, 43.80; H, 2.44; Cl, 14.07.

EXAMPLE 10

A mixture of 42.1 g. (0.20 mole) of p-chlorophenoxyacetylcyanamide, 13.2 g. (0.20 mole) of 85% potassium hydroxide, and 100 ml. of water was heated to boiling, charcoaled, and the solution filtered. After cooling, the crystals were filtered, and air dried. Recovery was 21.5 g. (43.2% yield) M.P. 260–261° C. The following analytical data revealed that potassium p-chlorophenoxyacetylcyanamide had been obtained.

*Analysis.*—Calcd. for $C_9H_6ClN_2O_2K$ (percent): C, 43.46; H, 2.41; N, 11.26. Found (percent): C, 43.53; H, 2.57; N, 11.41.

EXAMPLE 11

A mixture of 36.7 g. (0.15 mole) of 2,4-dichlorophenoxyacetylcyanamide, 9.9 g. (0.15 mole) of 85% potassium hydroxide, and 100 ml. of water was heated to boiling, the solution charcoaled, filtered, and cooled. The filtered solid was washed with a small amount of cold water, and air dried. The off-white product weighed 24.8 g. (54.9% yield) and melted at 236–237° C. Elemental analysis revealed that potassium 2,4 - dichlorophenoxyacetylcyanamide hydrate had been obtained.

EXAMPLE 12

To a solution of 9.9 g. (0.15 mole) of 85% potassium hydroxide in 75 ml. of water was added 41.9 g. (0.15 mole) of 2,4,5 - trichlorophenoxyacetylcyanamide. The mixture was heated to boiling, the solution charcoaled, filtered, and cooled. The resulting colorless salt weighed 26.9 g. (53.4% yield) and melted at 261–262° C. Elemental analysis revealed that potassium 2,4,5-trichlorophenoxyacetylcyanamide hydrate has been obtained.

EXAMPLE 13

A mixture of 35.9 g. (0.15 mole) of 2-methyl-4-chlorophenoxyacetylcyanamide, 9.9 g. of 85% potassium hydroxide, and 75 ml. of water was heated to boiling, charcoaled, filtered, and cooled. Solid failed to separate and 75 ml. of ethanol was added wherein a solid product separated out. The recovered off-white solid weighed 6.4 g.; M.P. 236–237° C. The following analytical data revealed that potassium 2-methyl-4-chlorophenoxy-acetylcyanamide had been obtained.

*Analysis.*—Calcd. for $C_{10}H_8ClN_2O_2K$ (percent): C, 45.71; H, 3.04; Cl, 13.52. Found (percent): C, 45.49; H, 3.05; Cl, 13.54.

EXAMPLE 14

A solution of 31.5 g. (0.15 mole) of o-chlorophenoxyacetylcyanamide in 200 ml. of water containing 9.9 g. (0.15 mole) of 85% potassium hydroxide was heated to boiling, charcoaled, and filtered. A solution of 17.5 g. (0.08 mole) of zinc acetate dihydrate in 100 ml. of water was added to the filtrate, giving a tan gum. After solidification, the solid was filtered, washed well with water and air dried. The yield was 5.2 g. or 6.5% of a tan solid melting at 219–220° C. Elemental analysis indicated that this solid was essentially zinc o-chlorophenoxyacetylcyanamide hydrated with 5–6 moles of water.

EXAMPLE 15

A solution of 42.1 g. (0.20 mole) of p-chlorophenoxyacetylcyanamide and 13.2 g. (0.20 mole) of 85% potassium hydroxide in 200 ml. of water was heated, charcoaled, and filtered. A solution of 22.0 g. (0.10 mole) of zinc acetate dihydrate in 100 ml. of water was added to the filtrate. A gummy precipitate formed which soon became solid. The product was filtered, washed well with water, and air dried. The yield of off-white tetrahydrate was 45.8 g. (82.3% yield); M.P. 100–101° C. Elemental analysis revealed that zinc p-chlorophenoxyacetylcyanamide tetrahydrate had been obtained.

EXAMPLE 16

A solution of 36.7 g. (0.15 mole) of 2,4-dichlorophenoxyacetylcyanamide and 9.9 g. (0.15 mole) of 85% potassium hydroxide in 200 ml. of water was heated, charcoaled, and filtered. A solution of 17.5 g. (0.08 mole) of zinc acetate dihydrate in 100 ml. of water was added to the filtrate, giving a gummy precipitate. After the gum became solid, the material was filtered, washed with water, and air dried. The product weighed 29.1 g. (65.9% yield) and melted at 122–123° C. Elemental analysis revealed that zinc-2,4-dichlorophenoxyacetylcyanamide dihydrate had been obtained.

EXAMPLE 17

A mixture of 41.9 g. (0.15 mole) of 2,4,5-trichlorophenoxyacetylcyanamide, 9.9 g. (0.15 mole) of 85% potassium hydroxide, and 200 ml. of water was heated to boiling. The solution was charcoaled and filtered. A solution of 17.5 g. (0.08 mole) of zinc acetate dihydrate in 200 ml. of water was added to the filtrate, giving a thick, colorless precipitate. The solid was filtered, washed well with water, and air dried. The yield of product was 48.1 g. (85.7% yield); M.P. 209–210° C. Elemental analysis indicated that zinc 2,4,5-trichlorophenoxyacetylcyanamide hexahydrate had been obtained.

EXAMPLE 18

A mixture of 42.1 g. (0.20 mole) of p-chlorophenoxyacetylcyanamide, 7.7 g. (0.10 mole) of 96% calcium hydroxide, and 100 ml. of water was heated to boiling. Almost complete solution occurred. The solution was charcoaled, filtered, and cooled. The recovered product weighed 5.1 g. (11.1% yield); M.P. 194–195° C. Elemental analysis revealed that calcium p-chlorophenoxyacetylcyanamide had been obtained.

As noted in the preceding discussion, the halogenated aryloxyacetyl cyanamides I are useful agricultural chemicals. A number of the compounds I are active as insecticides. However, the substituted cyanamides of this invention are characterized by outstanding properties as herbicides, and it is in this agricultural area that they are most useful.

In general, members of the series I are quite active in herbicidal applications. For instance, they are useful as aquatic herbicides as shown by extensive testing against mixed algae and duckweed. The substituted cyanamides of this invention are potent broad spectrum herbicides against a wide variety of the so-called grassy weeds in addition to exerting this same desirable effect upon various broad-leaved weeds. Supplementing this herbicidal activity this herbicidal activity is the fact that the substituted cyanamides I are selectively phytotoxic, since they do not seriously affect the growth of many cash crops. In addition, herbicidal activity for these compounds has been demonstrated when they are utilized in both pre-emergence and post-emergence treatment.

The outstanding herbicidal effectiveness for these compounds is surprising and unexpected, since it has been found, for instance, that the somewhat analogous cyanamides having a halogenated aryl group substituted instead of the halogenated aryloxyacetyl group are nearly devoid of herbicidal activity. Thus, for instance, it has been found that p-chlorophenoxyacetyl cyanamide is a particularly outstanding herbicide, while p-chlorobenzoyl cyanamide is practically inactive as a herbicide.

The efficacy of the compounds I as herbicides has been clearly demonstrated. For instance, a primary screening evaluation revealed that the halogenated aryloxyacetyl cyanamides at a dosage level of 10 lbs./acre were effective in nearly completely inhibiting the growth of a mixture of weeds including rye grass, crab grass, pigweed and mustard representing common species of unwanted plants of both grassy and broad-leaf type. These superior results were obtained when the cyanamides were employed in both pre- and post-emergence treatment.

More advanced testing has confirmed the excellent herbicidal properties exhibited by the members of the series I, and in addition this further testing has revealed the selective nature of the phytotoxicity possessed by these compounds. For instance, greenhouse flats were planted with seeds of different plants including weed and crop species for evaluation of the phytotoxic effects of the compounds I, and the following procedure was utilized in this evaluation. First the soil in the flats was seeded with crop seeds, and these seeds were covered with a layer of soil. Next weed seeds were planted on designated parts of the soil, and these seeds were covered with another layer of soil. The flats were then sprayed with acetonewater solutions of selected members of the series I prior to placing the flats in growing rooms maintained at constant conditions of temperature, humidity and lighting to encourage optimum plant growing. After a period of 2½ weeks, the flats were examined in order to determine the effects of the halogenated aryloxyacetyl cyanamides on the varied weed and crop species which had been planted.

In the following table wherein the results of this test are tabulated, the plant and weed species are represented by the following letters:

A—crab grass  
B—pigweed  
C—mustard  
D—Johnson grass  
E—barnyard grass  
F—foxtail  
G—corn  
H—cotton  
I—Clinton oats The relative value of each compound with respect to its herbicidal effect on the various plants is indicated by a number as follows:

0—no phytotoxicity  
1-4—slight phytotoxicity  
5-7—moderate phytotoxicity  
8-10—severe phytotoxicity

TABLE I

| | Lbs. per acre | A | B | C | D | E | F | G | H | I |
|---|---|---|---|---|---|---|---|---|---|---|
| p-Chlorophenoxyacetylcyanamide | 10 | 10 | 9 | 9 | 10 | 10 | 9 | 3 | 10 | |
| | 5 | 10 | 9 | 9 | 10 | 10 | 9 | 3 | 10 | |
| | 1 | 10 | 9 | 9 | 10 | 10 | 9 | 2 | 10 | 2 |
| Zinc p-chlorophenoxyacetylcyanamide tetrahydrate | 10 | 10 | 10 | 9 | 10 | 10 | 10 | 7 | 10 | |
| | 5 | 10 | 10 | 9 | 10 | 9 | 10 | 3 | 9 | |
| | 1 | 9 | 10 | 9 | 10 | 7 | 5 | 0 | 7 | |
| Zinc 2,4-dichlorophenoxyacetylcyanamide dihydrate | 10 | 10 | 10 | 10 | 10 | 10 | 10 | 9 | 10 | |
| | 5 | 10 | 10 | 10 | 10 | 10 | 9 | 7 | 9 | |
| | 1 | 9 | 10 | 9 | 9 | 5 | 6 | 0 | 8 | |
| 2,4,5-trichlorophenoxyacetyl-N-methylcyanamide | 10 | 10 | 10 | 10 | 10 | 10 | 9 | 7 | 5 | |
| | 5 | 10 | 10 | 9 | 9 | 9 | 9 | 6 | 5 | |
| | 1 | 9 | 10 | 9 | 9 | 7 | 9 | 5 | 1 | |

The data in the above table verifies the high activity of members of the series I as pre-emergence herbicides against a wide variety of weed species. Furthermore, it reveals the selective phytotoxicity exhibited by several of the members when used at varied dosage levels wherein undesired plant growth is effectively inhibited, but the growth of three valuable cash crops (corn, cotton, oats) is not significantly adversely affected.

The outstanding effectiveness of the halogenated aryloxyacetyl cyanamides as herbicides was further verified by a randomized complete block field test in a known corn producing area. p-Chlorophenoxyacetyl cyanamide was utilized as the active herbicidal ingredient in this test. This specialized field test was accomplished in the following manner. A test field was divided into sixteen plots with suitable buffer zones between each plot. p-Chlorophenoxyacetyl cyanamide was applied to four plots at a rate of 10 lbs./acre, to four plots at a rate of 5 lbs./acre, and to four plots at a rate of 1 lb./acre, while no active herbicidal ingredient was utilized in the remaining four plots. Plot assignments were given randomly. A known amount of corn was planted in each of the sixteen plots, and seven weed species (rye grass, crab grass, pigweed, mustard, Johnson grass, barnyard grass, and foxtail) were seeded randomly over the sixteen plots. After a six-week growing period, examination of the test plots was carefully made with respect to (a) corn wet weights of one half the corn in each plot without altering row spacing, (b) weed count in two square feet of each plot selected randomly, and (c) an evaluation of the weed and plant conditions in each plot.

With respect to corn wet weight, there was no significant difference between the wet weight of the corn in the control plots and the wet weight of the corn in the plots treated with the p-chlorophenoxyacetyl cyanamide at 1 lb./acre.

Weed control in the treated plots was excellent. An average of 97% of the weeds were controlled in the plots having an active ingredient concentration of 10 lbs./acre, and likewise at 5 lbs./acre there was a 94% weed control. At 1 lb./acre there was still a 70% weed control.

With respect to general weed and plant conditions, a particularly outstanding result was obtained in the plots containing 1 lb./acre of the active ingredient. There was a very minor phytotoxic effect in these plots on the corn plants while there was a very high herbicidal activity on the grassy and broad-leaf weeds in these plots. In general, the active ingredient did not exhibit any significant phytotoxicity on the corn until a rate of more than 5 lbs./acre was used.

The above tests clearly demonstrate the effectiveness of the substituted cyanamides I as broad spectrum herbicides which may be utilized in either pre- or post-emergence treatment against both grassy and broad-leaf weeds. All of the compounds I are active as herbicides, but especially potent members, and therefore preferred embodiments of this invention include the compounds I wherein R represents chlorinated phenyl, R' represents hydrogen, and R" represents either hydrogen, lower alkyl, an alkali metal or a metal of Group II in the Periodic Table including the alkaline earth metals. Perhaps the outstanding member of the series which embodies high herbicidal activity along with minimal phytotoxicity against certain cash crops is p-chlorophenoxyacetyl cyanamide.

The agricultural method of this invention thus comprises applying a herbicidal amount of the substituted cyanamides I to the locus to be protected from undesirable weed growth; for example, it is applied directly to weeds in post-emergence treatment and to soil areas in pre-emergence treatment.

Although the herbicides I may be directly administered to the area where control of weed growth is desired, they are preferably admixed with carriers and diluents which are commonly referred to as pest control adjuvants. Thus a wide variety of such adjuvants may be utilized with the herbicides of this invention to provide herbicidal formulations conveniently adapted for application using conventional applicator equipment. In this respect, both solid and liquid herbicidal formulations containing a member of the series I as the essential active ingredient are provided in accordance with this invention.

For example, dust compositions are readily provided by mixing the active substituted cyanamides I with various free-flowing solid carriers and grinding the resulting mixture to obtain a dust having an average particle size of about 20–50 microns. Concentration by weight of the active ingredient in these dusts is generally in the range of about 5–20% although larger concentrations may be utilized if desired. Among the solid carriers which may be employed in such formulations are natural clays such as attapulgite and kaolinite clays, diatomaceous earth, finely divided talcs and synthetic mineral fillers derived from silica and silicate such as synthetic fine silica and synthetic calcium and magnesium silicates. Other suitable carriers include magnesium and calcium carbonates.

The compounds I may be advantageously formulated with other carriers to provide wettable powders. These powders are conveniently prepared by mixing the active ingredient with solid carriers of the aforementioned type and adding to the mixture a surface-active agent in amount sufficient to impart water dispersibility to the powdered compositions. Aqueous dispersions of such wettable powders are particularly adapted for spraying and sprinkling operations on areas which are to be protected from weed growth.

Numerous surface-active agents are available and suitable for use in such wettable powders. These agents may be referred to as wetting or dispersing agents, and they may be of the nonionic, cationic or anionic type. Mixtures of such agents are conveniently employed in these formulations in a manner well known to those skilled in this art. For example, among those surface-active agents commonly employed in these compositions are alkyl aryl sulfonates such as sodium decyl benzene sulfonate, fatty alcohol sulfates such as sodium dodecyl sulfate, alkali metal oleates, sodium lignosulfonate and the like. A comprehensive listing of many other surface-active agents suitable for use in the formulation of typical agricultural dispersions, suspensions, etc., has been prepared and disclosed by McCutcheon in "Soap and Chemical Specialties," 31, Nos. 7-10 (1955).

Wettable powders of the above type will usually contain about 0.1–10.0% by weight of the aforementioned surface-active agents with the preferred concentration naturally being dependent upon the nature of the system in which the agent is used and the particular type of application technique being employed. Wettable powders containing about 2–5% of these surface-active agents are generally prepared. For instance, a typical formulation which has been found to be useful is a wettable powder comprising 65% by weight of p-chlorophenoxyacetyl cyanamide, 30% by weight of Barden clay, 2% by weight of an oxyalkylated nonylphenol having a molecular weight of about 200 and 3% by weight of a lignosulfonate dispersing agent.

Other solid herbicidal compositions containing the cyanamides I as active ingredients are provided in accordance with this invention by dissolving the chemical in a volatile solvent (i.e., acetone) and impregnating this solution upon granular solids such as attapulgite clay, ground vegetable shells, walnut shells, and the like. Upon removal of the solvent, potent solid herbicidal formulations are obtained. A typical granular formulation of this type would contain 10–20% by weight of the herbicidal ingredient.

Similarly, suspension-type formulations may be conveniently prepared having the substituted cyanamides I as the active ingredients. For instance, an acetone solution of p-chlorophenoxyacetyl cyanamide containing one of the above-listed dispersing agents can be added to water to provide suspensions which are especially suitable for spraying operations.

Emulsifiable concentrates containing the active ingredients I are also readily prepared and are suitable in applying the herbicides to the locus to be protected. These formulations are provided by dissolving the substituted cyanamides in a suitable solvent (e.g., xylene) and adding an appropriate surfactant to the resultant solution which is capable of forming an emulsion upon addition to water. Typically, a xylene solution of the active ingredient contains about 5% by weight of surfactant which advantageously might comprise a mixture of a non-ionic surfactant such as oxyalkylated nonylphenol and an anionic surfactant such as an alkylbenzene sulfonate.

Naturally, in order to control the undesirable weed growth, the active ingredient must be applied to the area or locus to be protected in an amount sufficient to exert the desired herbicidal action. Thus, it may be necessary to apply different amounts of the cyanamides I to achieve a desired result depending upon the extent and nature of weed growth, application procedures and other varying features. Generally, it has been found that effective herbicidal action can be obtained by applying the active ingredients of this invention at a rate of about 1–10 pounds per acre with an amount of 5 pounds per acre being adequate for most applications. However, high levels of herbicidal activity have been obtained when selected members of the series I have been utilized in even lesser amounts per acre such as ½–¾ lbs. The formulations utilized may contain anywhere from 0.5% to about 90% by weight of the active ingredient, again depending upon the particular results desired, the methods of application, etc.

What is claimed is:
1. A compound of the formula

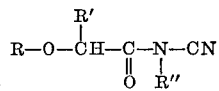

wherein R represents halogenated aryl, said aryl group being phenyl, tolyl, xylyl or naphthyl; R' represents hydrogen or alkyl having 1–4 carbon atoms; and R" represents hydrogen, alkyl having 1–4 carbon atoms, an alkali metal or a metal of Group II in the Periodic Table.

2. A compound of claim 1 wherein R' represents hydrogen.

3. A compound of claim 2 wherein R represents chlorinated aryl.

4. A compound of claim 2 wherein R represents chlorinated tolyl.

5. A compound of claim 3 wherein R" represents hydrogen.

6. A compound of claim 3 wherein R" represents alkyl having 1–4 carbon atoms.

7. A compound of claim 3 wherein R" represents an alkali metal.

8. A compound of claim 3 wherein R" represents a metal selected from Group II of the Periodic Table.

9. A compound of the formula

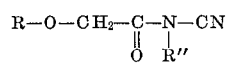

wherein R represents chlorinated phenyl; and R" represents hydrogen, alkyl having 1–4 carbon atoms, an alkali metal or a metal of Group II in the Periodic Table.

10. A compound of claim 9 wherein R" represents hydrogen.

11. The compound of claim 10 having the name p-chlorophenoxyacetyl cyanamide.

12. The compound of claim 10 having the name 2,4-dichlorophenoxyacetyl cyanamide.

13. The compound of claim 10 having the name 2,4,5-trichlorophenoxyacetyl cyanamide.

14. A compound of claim 9 wherein R" represents alkyl having 1–4 carbon atoms.

15. The compound of claim 14 having the name 2,4,5-trichlorophenoxyacetyl-N-methylcyanamide.

16. A compound of claim 9 wherein R" represents an alkali metal.

17. A compound of claim 9 wherein R" represents a metal selected from Group II of the Periodic Table.

18. The compound of claim 17 having the name zinc p-chlorophenoxyacetyl cyanamide.

19. The compound of claim 17 having the name zinc 2,4-dichlorophenoxyacetyl cyanamide.

References Cited

Houben-Weyl: Methoden der Chemie, vol. 8, p. 94 (1952).

NORMA S. MILESTONE, Primary Examiner

H. I. MONTZ, Assistant Examiner

U.S. Cl. X.R.

260—429, 431, 544, 559; 71—97, 105